Feb. 1, 1927.
F. J. FOSTER
1,615,902
CULTIVATOR
Filed Aug. 18, 1924   3 Sheets-Sheet 1
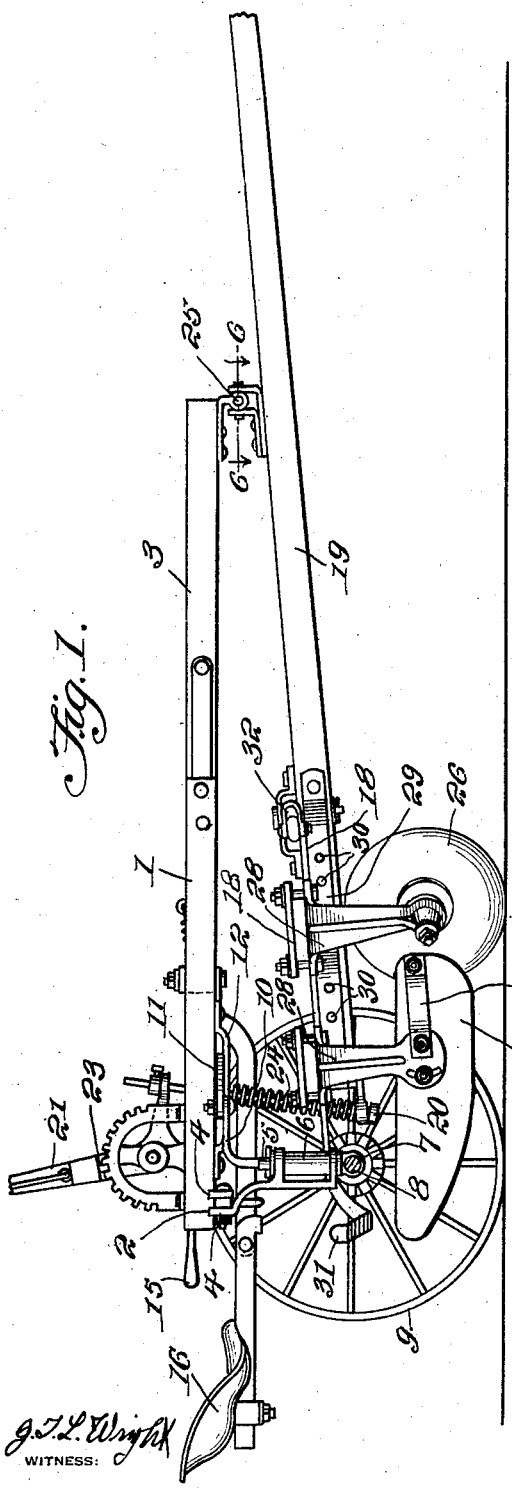
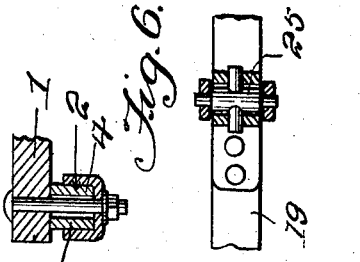
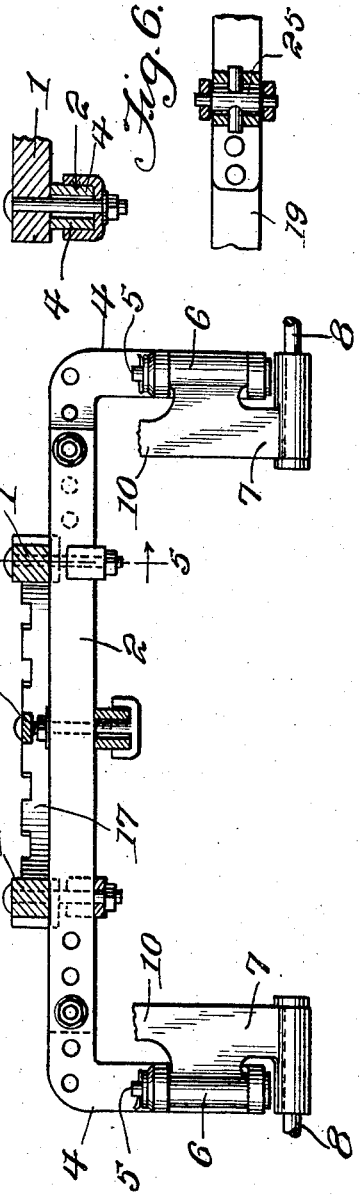
Fred J. Foster
INVENTOR
BY Victor J. Evans
ATTORNEY

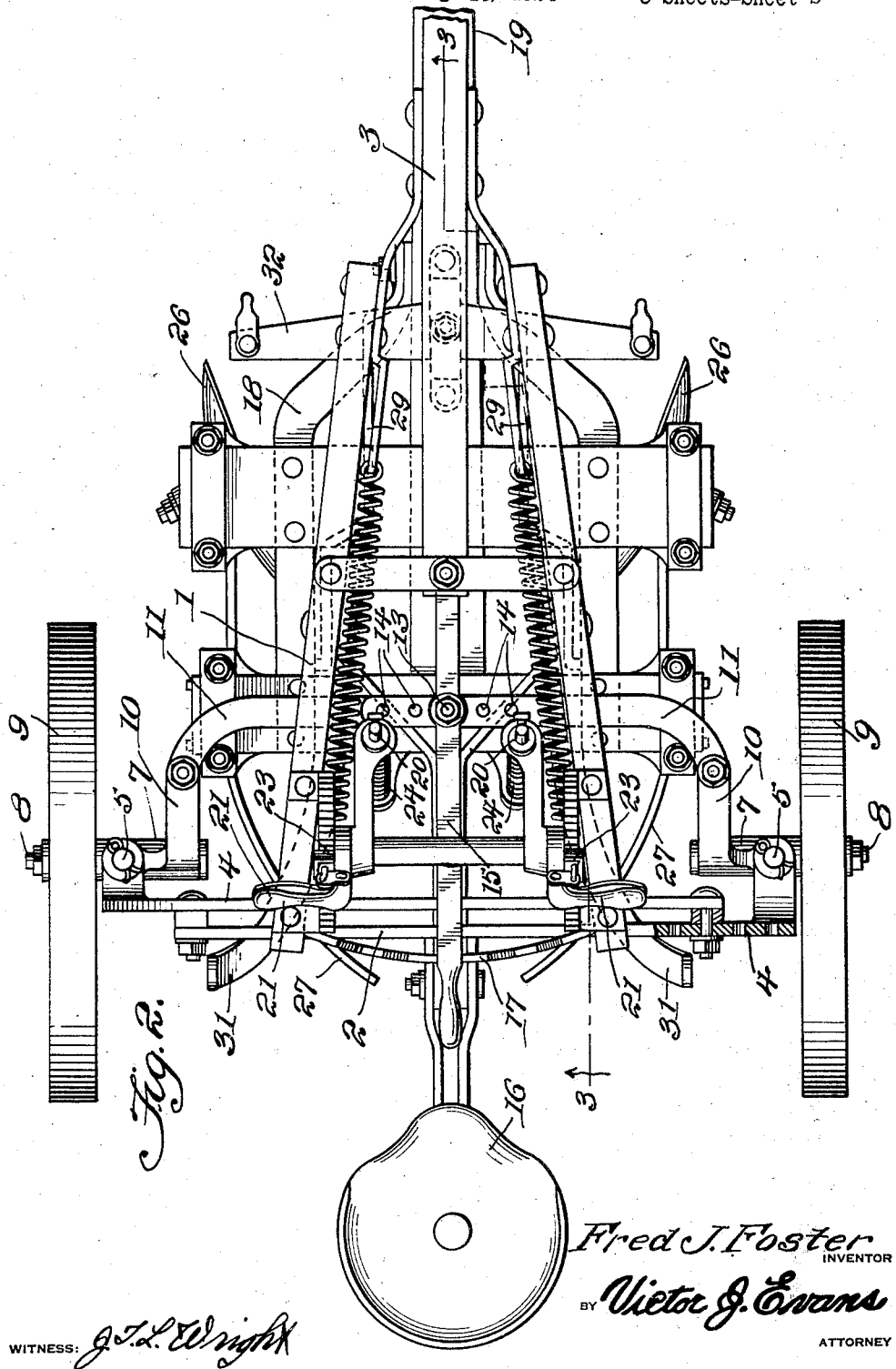

Feb. 1, 1927.
F. J. FOSTER
CULTIVATOR
Filed Aug. 18, 1924
1,615,902
3 Sheets-Sheet 3
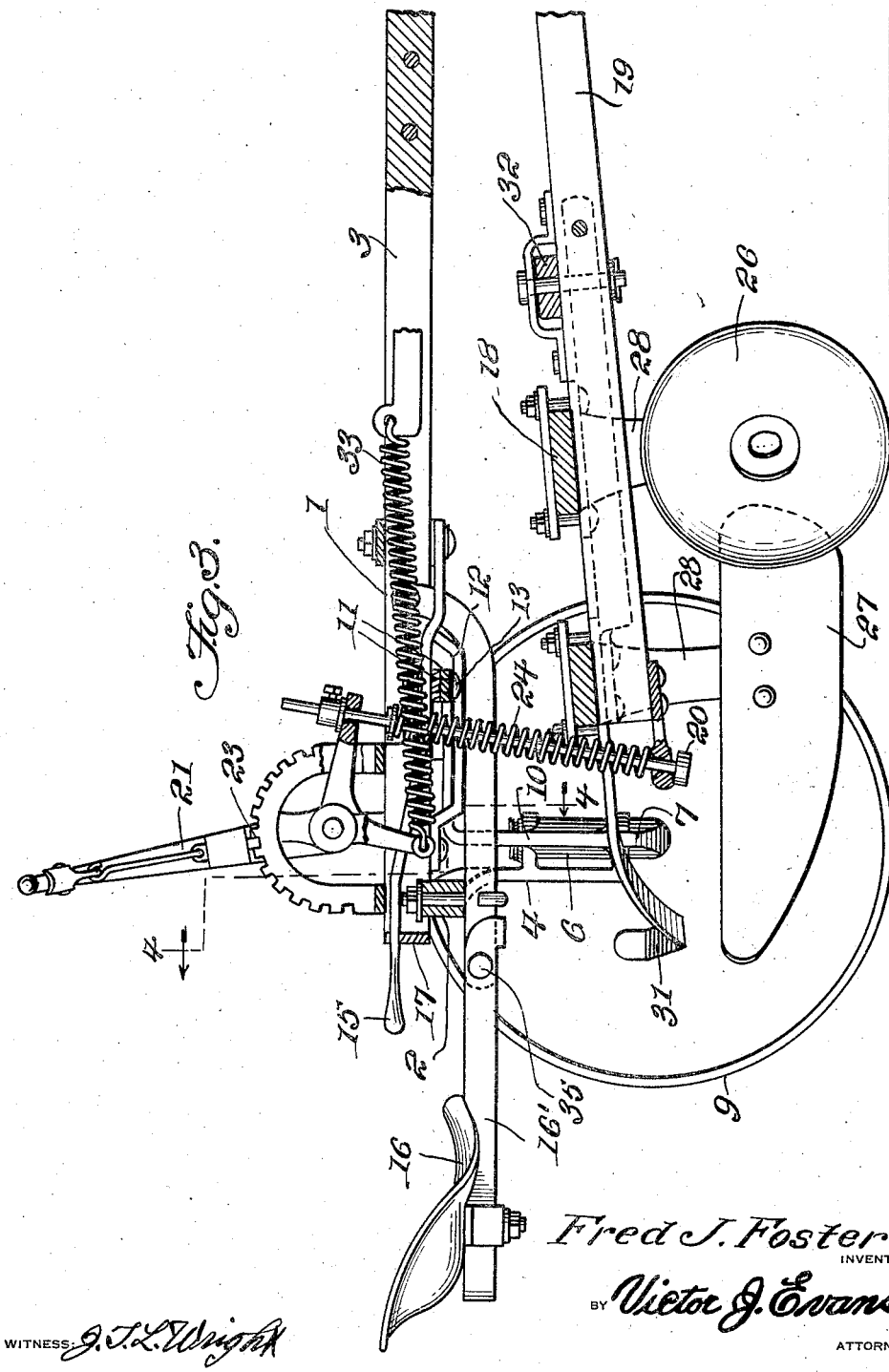
Fred J. Foster
INVENTOR
BY Victor J. Evans
ATTORNEY
WITNESS: J. L. Wright Patented Feb. 1, 1927.

1,615,902

UNITED STATES PATENT OFFICE.

FRED J. FOSTER, OF MONTICELLO, MAINE.

CULTIVATOR.

Application filed August 18, 1924. Serial No. 732,866.

This invention relates to a cultivator, the general object of the invention being to provide means whereby the hoes or plows can be shifted from one side to the other in order to avoid misplaced hills and to cause the plows to follow crooked rows as well as to facilitate the cultivation of crops which are planted on sides of hills.

Another object of the invention is to provide a frame for carrying the plows or hoes which is suspended from the wheel supported frame and to furnish means for raising the plow frame whenever desired.

A still further object of the invention is to provide means for rocking the wheels bodily about a vertical axis so as to place the wheels at an incline.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the invention.

Figure 2 is a plan view thereof.

Figure 3 is a section on line 3—3 of Figure 2.

Figure 4 is a section on line 4—4 of Figure 3.

Figure 5 is a section on line 5—5 of Figure 4.

Figure 6 is a section on line 6—6 of Figure 1.

In these views 1 indicates the main frame which includes the arch 2 and the short tongue 3. At each end of the arch brackets 4 provided for a vertical shaft 5, which is engaged by a sleeve 6. This sleeve is attached to a body 7 which carries a spindle 8 for the wheel 9. Thus the wheel can be rocked about a vertical axis so that it can be placed at an inclined position in relation to the frame. Curved arms 10 extend upwardly from the bodies 7 and these arms are connected together by the links 11 which pass through guides 12 on the bottom of the frame and which are adjustably connected together by the bolt 13 which passes through any one of a plurality of pairs of holes 14. This bolt also passes through a hole formed in a lever 15 which has its front end pivoted to the end of the tongue 3 and its rear end being arranged adjacent the seat 16 which is suitably supported on the frame. Ratchet mechanism 17 is provided for holding the lever in adjusted position. It will be seen that by moving the lever either towards the right or left that the links will be shifted longitudinally and thus the arms 10 moved to adjust the spindle bodies and thus set the wheels in a certain position in relation to the device. A hoe carrying frame 18, which includes the main tongue 19, is suspended from the frame 1 by means of the bars 20, the ends of the bars being fastened to the projecting lower ends of the hand levers 21 which are pivoted in the main frame and which are so located that they can be manipulated by a person occupying the seat. These levers are provided with ratchet means 23 for holding them in adjusted position. By pulling these levers downwardly their projecting ends are raised, thus causing the bars to lift the plow frame. Springs 24 on said rods act to press the plows or hoes into the ground and permit the plow frame to raise if the plow should strike an obstruction in the ground. The tongue 3 is hinged at its free end to the tongue 19, as shown at 25, the hinge permitting movement of the tongues in relation to each other in different directions. The plow frame carries the discs 26 and the sweeps 27, these parts being pivotally connected with the depending beams 28 on the frame. This frame also carries the brackets 29 which are provided with the holes 30 so that spring toothed cultivators and the like can be attached to the frame. Foot rests 31 are connected with the rear part of the frame 18 so that a person occupying the seat can, by pressing upon said rests with his feet, swing the plow frame to one side or the other. The double-tree is shown at 32.

Springs 33 are connected with the tongue 3 and with the lower ends of the levers 21, these springs facilitating the raising of the frame 18 by the operator. I also provide the sweeps with braces 34 which help to keep the front ends of the sweeps from bending. I also prefer to hinge the seat bar 16' to the frame, as shown at 35 so that the seat and bar can be folded over when the machine is not in use and thus save storage space.

From the above it will be seen that the driver or operator can, by pressing upon the foot rests, swing the plow frame from one side to the other so as to cause the plows to dodge misplaced hills or to follow crooked rows. He can also set the wheels at an angle to guide the implement on hill sides and the like by shifting the lever 15 to cause the links to turn the spindle bodies on their shafts. By adjusting the links the wheels can be set to suit different widths of rows. When the plows are not to be used the levers 21 are pulled downwardly so as to raise the plow frame and thus lift the plows above the ground.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cultivator of the class described comprising a main frame including a yoke, brackets at each end of the yoke, a vertical shaft in the bracket at each end of the yoke, a sleeve rotatably mounted upon each vertical shaft, a spindle body integral with each sleeve, a spindle carried by each spindle body, a wheel mounted on each spindle, a curved arm on each spindle body, links having one of their ends loosely connected with the curved arms and their other ends arranged in overlapping relation and formed with transverse openings adapted to be aligned whereby to adjustably connect said links, a hand lever having connection with the links at their overlapping parts for moving the spindle bodies on the axis, and means for retaining said lever in various positions after adjusting the spindle bodies.

In testimony whereof I affix my signature.

FRED J. FOSTER.